(12) United States Patent
Woods

(10) Patent No.: US 9,785,560 B2
(45) Date of Patent: Oct. 10, 2017

(54) SCENE-ISOLATED INTERNET APPLICATION

(71) Applicant: salesforce.com, inc., San Francisco, CA (US)

(72) Inventor: Joshua Michael Woods, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 552 days.

(21) Appl. No.: 14/257,844

(22) Filed: Apr. 21, 2014

(65) Prior Publication Data

US 2014/0313215 A1 Oct. 23, 2014

Related U.S. Application Data

(60) Provisional application No. 61/813,932, filed on Apr. 19, 2013.

(51) Int. Cl.
*G06T 1/00* (2006.01)
*G06F 12/0862* (2016.01)
*G06F 17/30* (2006.01)

(52) U.S. Cl.
CPC .......... *G06F 12/0862* (2013.01); *G06F 17/30* (2013.01)

(58) Field of Classification Search
CPC ............................ H04N 5/44543; H04L 67/32
See application file for complete search history.

(56) References Cited

U.S. PATENT DOCUMENTS

| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |

(Continued)

*Primary Examiner* — Phi Hoang
(74) *Attorney, Agent, or Firm* — Lorenz & Kopf, LLP

(57) ABSTRACT

Computer-implemented systems, methods and apparatus are provided for rendering different scenes of an application. An application framework is provided that includes a scene controller and a scene cache pre-fetch module that stores at least some of the different scenes as cached scenes. When the scene controller receives a request for a new scene (e.g., to change the current active scene) it can determine whether that new scene is stored at the scene cache pre-fetch module. If so, the scene controller can load the cached scene directly from the scene cache pre-fetch module as a new active scene.

14 Claims, 3 Drawing Sheets

(56) References Cited

U.S. PATENT DOCUMENTS

| | | |
|---|---|---|
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,181,758 B1 | 2/2007 | Chan |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 8,015,495 B2 | 9/2011 | Achacoso et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 8,332,818 B1 * | 12/2012 | Haugh ................ G06F 11/3664 717/124 |
| 8,457,545 B2 | 6/2013 | Chan |
| 8,484,111 B2 | 7/2013 | Frankland et al. |
| 9,021,390 B1 * | 4/2015 | Pidhajecky ........... G06F 3/0481 463/42 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0162430 A1 * | 7/2008 | Gossweiler ........ H04N 5/44543 |
| 2008/0249972 A1 | 10/2008 | Dillon |
| 2009/0063414 A1 | 3/2009 | White et al. |
| 2010/0162229 A1 * | 6/2010 | Tsuk .................... G06F 9/44526 717/175 |
| 2012/0023084 A1 * | 1/2012 | Lalji ................... G06F 17/3002 707/706 |
| 2012/0102414 A1 * | 4/2012 | Demant .............. G06F 17/3089 715/753 |
| 2012/0271807 A1 * | 10/2012 | Smyth ............... G06F 17/30864 707/706 |
| 2013/0151943 A1 * | 6/2013 | Zhu .................... G06F 17/30905 715/234 |
| 2013/0178281 A1 * | 7/2013 | Ayyar ..................... A63F 13/12 463/30 |
| 2014/0245025 A1 * | 8/2014 | Fairless ................. G06F 21/602 713/189 |
| 2014/0371884 A1 * | 12/2014 | Maddern ............... G06F 19/366 700/90 |
| 2016/0191658 A1 * | 6/2016 | Kolam ................... H04L 67/32 709/217 |

* cited by examiner

SCENE-ISOLATED INTERNET APPLICATION

CROSS-REFERENCE TO RELATED APPLICATION

This application claims the benefit of U.S. provisional patent application Ser. No. 61/813,932, filed Apr. 19, 2013, the entire contents of which are incorporated by reference herein.

TECHNICAL FIELD

Embodiments of the subject matter described herein relate generally to application software. More particularly, embodiments of the subject matter relate to a framework for a scene-isolated Internet application.

BACKGROUND

In traditional Internet applications, such as a point-and-click, page-based Internet application, each time the user has an interaction with the application a new page gets loaded or the active page gets re-loaded. To create interactive experiences without page re-load, an increasing amount of development has been focused on building rich Internet applications.

A rich Internet application is a type of web application that is "persisted" to a certain extent. Each time the user interacts with the rich Internet application, the entire page is not reloaded or refreshed. In other words, when a web page loads and the user interacts with it, another new page is not loaded and the screen does not refresh while the user is interacting with it. Rather, a rich Internet application is a set of pages with different views or "scenes" that can be loaded based on a user's interactions with the rich Internet application. Each scene is a portion of the rich Internet application that is loaded while it is active and then discarded after certain user interactions or events. As such, a rich internet application can be referred to as a persisted Internet application.

An example of a rich Internet application would be Amazon.com. For example, on Amazon.com, when the user is on one scene of the application they may select an item they want to purchase, but when they transition to the checkout of that same application the screen will have different characteristics. Such an application includes a number of different scenes that, for example, allow a user to browse inventory, obtain details about the specific item of the inventory, and purchase that specific item of inventory if desired.

One challenge in developing a rich Internet application is that in many cases the rich Internet application can include a number of modules that are built by different developers. Because different developers write different parts of the application, this makes it hard to develop a full application in a way that is modular. For instance, when two different developers are collaborating in developing a web page application, they may use different versions of the same library that can end up conflicting. This makes it necessary to load (and reload) two separate versions of the application each time it is accessed by a user. Once the application is in use, it might be necessary to make changes, and therefore eventually it can be necessary to deconstruct each of the individual parts of the application. However, the controller of that application is unable to do that because the individual parts of the rich Internet application were not developed together.

Another challenge is that there are not many constructs for isolation or ways to segregate different types of content. For example, modern browsers have limited ability to isolate JavaScript and Cascading Style Sheet (CSS) resources. Another issue is that garbage collection is tricky in JavaScript and non-existent in CSS. To address this problem, one traditional approach focuses on building encapsulated JavaScript modules with corresponding mark-up and CSS data. This approach can work when the application is sufficiently small enough so that the entire application can be pulled down. For this reason, applications that have traditionally succeeded have been reasonably small in scope relatively speaking (e.g., a targeted mail application versus an extensive enterprise platform).

However, this approach can result in performance concerns particularly when the size of the application increases. For larger-scale applications, unified approaches have usually been required that also suffers from various drawbacks.

One existing way to provide isolation is by using an Inline Frame also called an IFrame. An IFrame is an HTML document embedded inside another HTML document on a website. The IFrame HTML element is often used to insert content from another source, such as an advertisement, into a Web page. Although an IFrame behaves like an inline image, it can be configured with its own scrollbar independent of the surrounding page's scrollbar. An IFrame can allow certain content to be isolated and protected from other different content because some of the content in an IFrame can load entirely separately from other content in the same IFrame.

In view of the above, it would be desirable to provide alternative methods, systems and apparatus for developing rich Internet applications.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

As used herein, a "scene" or a "view" refers to a sub-module or portion of a rich Internet application. When a scene is active and selected, that scene renders an active portion of the content of the rich internet application that can be used to perform particular functionality at any given time. A scene can be thought of as a persistent page that is available for some length of time at the browser, but that will eventually end and no longer be rendered at the browser (e.g., when a user interacts with the application and selects a new scene). Each scene has its own unique application data (e.g., HyperText Markup Language (HTML), Cascading Style Sheets (CSS), Java scripts, etc.) associated with it that defines the content and characteristics that are unique to that scene.

As used herein, an "active scene" is a sub-module or portion of the rich Internet application that is the currently active at any given time.

As used herein, the term "content" refers to textual, visual or aural information that is encountered as part of a user experience with an application. Content may include text, images, sounds, videos and animations. In addition, as used herein, the term "content" can also include application logic that is provided in conjunction with content to execute, render and/or display that content, and therefore is referred to as "application content."

Figure 1:
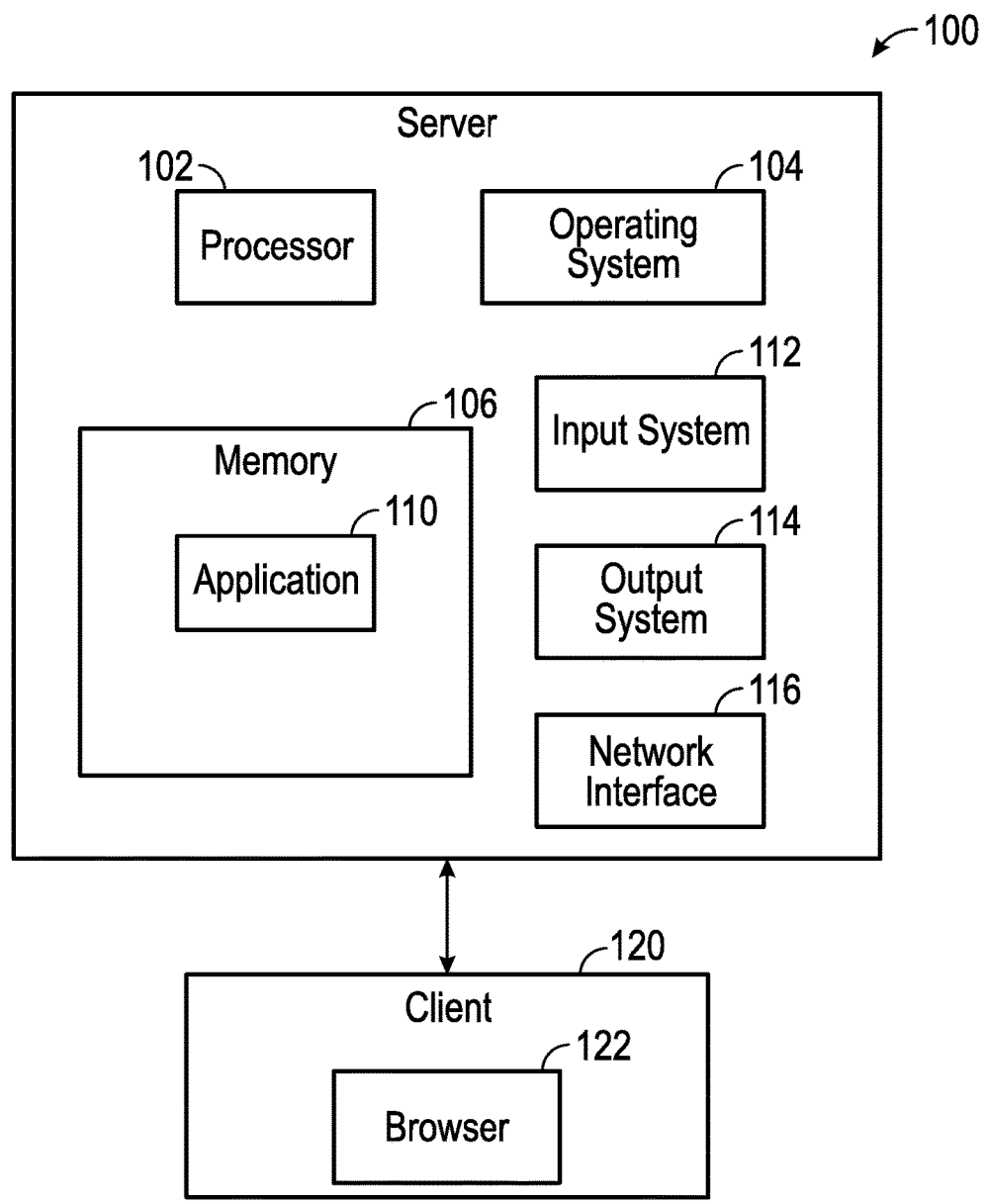
FIG. 1 illustrates a block diagram of an example system that may be used to execute a rich Internet application in accordance with the disclosed embodiments.

FIG. 1 illustrates a block diagram of an example server 100 and client 120 that may be used to execute a rich Internet application 110 in accordance with the disclosed embodiments. In one embodiment, the client 120 may be realized at the server 100 that loads and executes the application (e.g., when locally viewing the application 110). In other embodiments, the server 100 may be realized at any other device that is designed to generate and/or return the application 110 to the client 120. Thus, although the client 120 is illustrated as a separate block to show that it can be a separate device, such as a desktop or laptop computer, a smart-phone, a tablet computer, or any another such device, such as a remote client 120 having a web browser 122, it should be understood that FIG. 1 is a non-limiting representation and is not intended to limit the subject manner described herein in any way.

The server 100 includes a processor 102, an operating system 104, a memory 106 capable of storing the rich Internet application 110, an input system 112 that includes at least one input device (not illustrated), an output system 114 that includes at least one display device or module (not illustrated), and a network interface 116.

The processor 102 can be any known type of processor capable of processing computer-executable instructions. The processor 102 generally represents the hardware, software, firmware, processing logic, and/or other components of the processor 102 configured to support operation of the server 100 and/or execute various functions and/or processing tasks described in greater detail below. Depending on the embodiment, the processor 102 may be implemented or realized with a general purpose processor, a microprocessor, a controller, a microcontroller, a state machine, a content addressable memory, an application specific integrated circuit, a field programmable gate array, any suitable programmable logic device, discrete gate or transistor logic, discrete hardware components, or any combination thereof, configured to perform the functions described herein. Furthermore, the steps of a method or algorithm described in connection with the embodiments disclosed herein may be embodied directly in hardware, in firmware, in a software module executed by processor 102, or in any practical combination thereof.

The memory 106 is coupled to the processor 102, and the memory 106 may be realized as any non-transitory short or long term storage media capable of storing computer-executable programming instructions or other data for execution by the processor 102, including any sort of random access memory (RAM), read only memory (ROM), flash memory, registers, hard disks, removable disks, magnetic or optical mass storage, and/or the like. In an exemplary embodiment, the computer-executable programming instructions, when read and executed by the processor 102, cause the processor 102 to execute and perform one or more of the processes tasks, operations, and/or functions described herein. For ease of illustration, FIG. 1 shows one block for each of processor 102 and memory 106; however, blocks 102 and 106 can each represent multiple processors and memory units, respectively.

The input system 112 generally represents the hardware and/or other components coupled to processor 102 for providing a user interface to server 100. For example, the input system 112 may be realized as a key pad, a keyboard, a touch panel, a touchscreen, or any other device capable of receiving input from a user.

The output system 114 can include an electronic display device configured to graphically display information and/or content under control of the processor 102.

The network interface 116 generally represents the hardware, software, firmware and/or combination thereof that are coupled to the processor 102 and configured to transmit and/or receive data packets to and/or from the server 100 via a communications network, such as the Internet or another computer network. In this regard, the network interface 116 may include one or more amplifiers, filters, modulators and/or demodulators, digital-to-analog converters (DACs), analog-to-digital converters (ADCs), antennas, or the like. The network interface 116 can be any conventional wired or wireless networking interface. The network interface 116 allows the server 100 to access a communications network (not illustrated). The communications network may be realized as any wired and/or wireless computer network that supports communications between the server 100 using one or more networking protocols and/or data communication methods, including, for example, IEEE 802.11 WiFi, Bluetooth, hypertext transport protocol (HTTP), transmission control protocol and/or Internet protocol (TCP/IP), and the like.

The rich Internet application 110 is integrated with using an application framework that will be described below with reference to FIGS. 2 and 3. The rich Internet application 106 may be stored in memory 106 or on any other suitable storage location or non-transitory computer-readable medium. The terms "application," "software application," "software package," "software code," and "program code" are used interchangeably. Once the rich Internet application 110 is created it can be loaded and executed at a server (such as server 100) to allow a user to interact with the rich Internet application 110. Alternatively, the rich Internet application 110 can be loaded and executed at a client device. The rich Internet application 110 includes a set of pages with different views, where each view is a particular scene (or screen view). As the user interacts with the rich Internet application 110 different scenes are rendered by the rich Internet application 110, where each scene corresponds to a particular portion of the rich Internet application 110.

Figure 2:
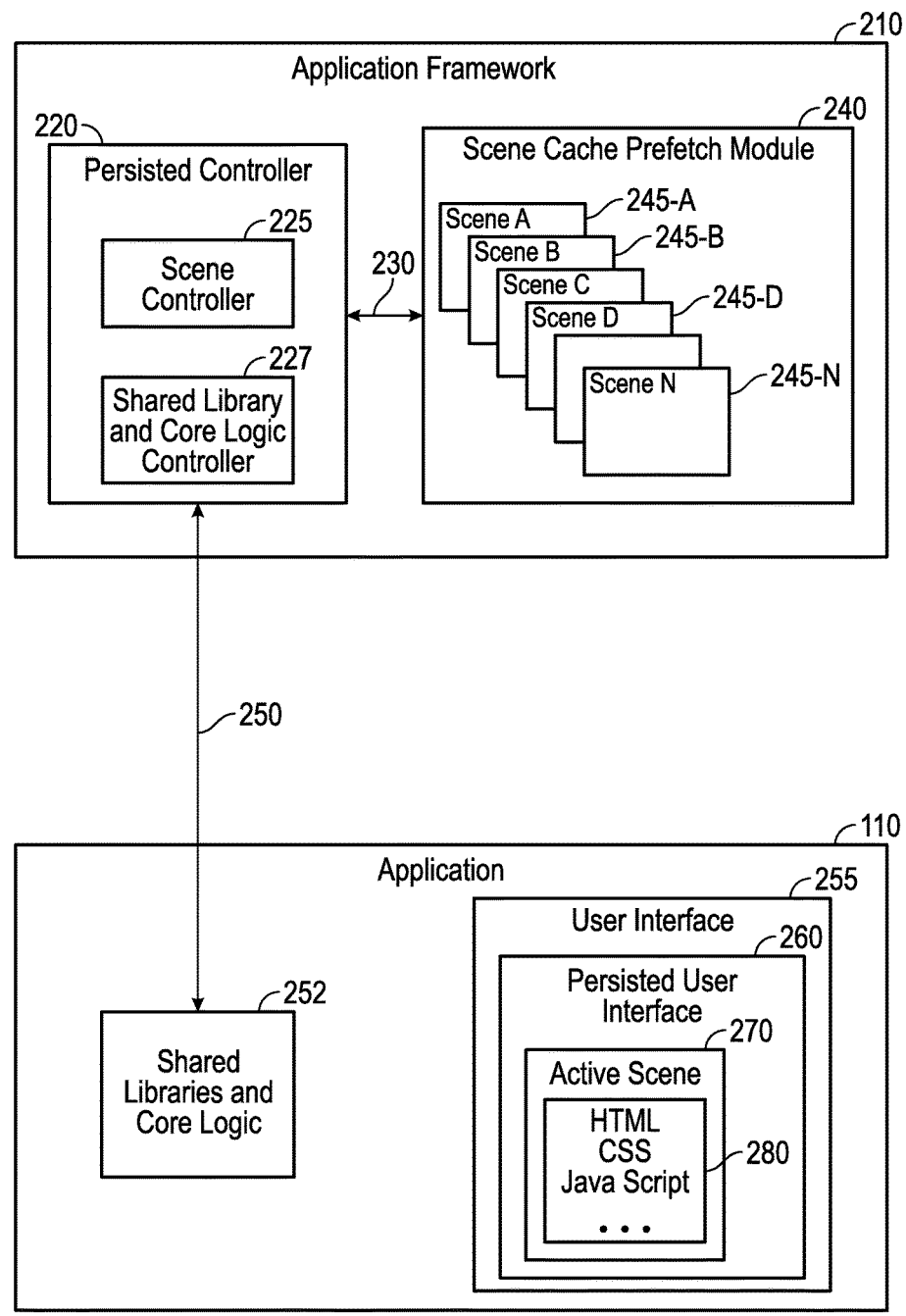
FIG. 2 is a block diagram that includes an application framework that can be integrated with a rich Internet application in accordance with the disclosed embodiments.

FIG. 2 is a block diagram 200 that includes an application framework 210 that can be integrated with a rich Internet application 110 in accordance with the disclosed embodiments.

The application 110 is built/constructed/developed so that it is integrated with the application framework 110 in a manner that allows the application 110 to leverage the capabilities of the application framework 210. Application 110 that represents one instance of a rich Internet application that is is integrated with the application framework 210. The application framework 210 can be used to control a user interface 255 of the application 110. The application framework 210 includes a persisted controller 220 and a scene cache pre-fetch module 240. The persisted controller 220 includes a scene controller 225 and a shared library and core logic controller 227. The rich Internet application 110 includes a set or group of shared libraries and core logic 252 and a user interface 255. The shared libraries and core logic 252 can be accessed and loaded by the shared library and core logic controller 227 so that they can then be used by the scene controller 225 to render the various scenes of the application 210.

The group of shared libraries and core logic 252 includes libraries and core logic that are specific to a particular rich Internet application 110 (e.g., the libraries are not generic to any application) created using the application framework 210. The shared libraries and core logic 252 are the libraries and logic that are used relatively frequently to render different scenes of the particular rich Internet application 110. The shared libraries and core logic 252 are persistent meaning that they are common across all scenes of that particular rich Internet application 110 and always part of that particular rich Internet application 110. As is known in the art, a library refers to a file that is a collection of implementations of behavior, written in terms of a language, that has a well-defined interface by which the behavior is invoked. A shared library is a file that is intended to be shared by executable files and further shared objects files. Modules used by a program are loaded from individual shared objects into memory at load time or run time.

The application 110 includes a user interface 255. The user interface 255 includes a persisted user interface that stores an active scene 270 and all of the application data 280 (e.g., HTML, CSS, Java scripts) associated with the active scene 270. The persisted user interface performs tasks and provides persistent content that is common to every scene of the application 110. The persistent content of the persisted user interface and is always visible on the user interface 255 of the application 110 and does not change from scene to scene within the user interface 255 of the application 110. An example of persistent content that is part of the persisted user interface would, for instance, as global navigation features on presented on the user interface 255 of website that do not change from scene to scene.

The active scene 270 is the scene that is currently active as the user interface 255 of the application 110. The scene controller 225 changes the active scene 270 as the user interacts with the application 110 (or in response to certain events). In a browser application that supports IFrames, each active scene 270 can be, for example, an IFrame that is unique, meaning that it has its own HTML, CSS, and JavaScript that is unique to that scene. As noted above, each scene has its own unique application data 280 (e.g., Hyper-Text Markup Language (HTML), Cascading Style Sheets (CSS), Java scripts, etc.) associated with it that defines the content and characteristics that are unique to that scene.

The shared library and core logic controller 227 can load the set of shared libraries and core logic 252 and store them. The set of shared libraries and core logic 252 can be stored either permanently or temporarily until they are no longer needed. The shared libraries/core logic 252 are controlled via the application framework 210 to expose it to scenes. As a user interacts with the rich Internet application 110, the persisted controller 220 uses the shared libraries and core logic 252 to render various scenes of the rich Internet application 110. The persisted controller 220 defines all of the logic used for loading and unloading scenes that make up the application 110.

In one embodiment, the scene controller 225 can receive requests, which are generated in response to a trigger, to change an active scene 270 that is currently active as the user interface 255 of the application. The trigger can be generated as a result of user interaction with the user interface of the application 110 such as selection of a new scene of the application 110, or generated as a result of a programmatic trigger, for example, a login timeout could be triggered, requesting the login screen be loaded.

When the scene controller 225 receives requests to launch different scenes of the application, the scene controller 225 requests changes to the scene that is currently active (i.e., the active scene 270). For example, in one scenario, when a user interacts with a user interface 255 of the rich Internet application 110 (e.g., via the input system 112 of FIG. 1), a request will be generated and sent to the scene controller 225 to request changes to the scene that is currently active (i.e., the active scene 270).

The scene controller 225 can load and execute each scene of the application 110, and potentially recycle scenes when they are not in use. In accordance with the disclosed embodiments, the scene controller 225 is associated and interacts with the scene cache pre-fetch module 240. The scene controller 225 and the scene cache pre-fetch module 240 communicate using inter-process communications as represented by arrow 230.

The scene cache pre-fetch module 240 stores particular inactive, cached scenes 245-A . . . 245-N and all of the application data (e.g., HTML, CSS, Java scripts) associated with each of those cached scenes 245-A . . . 245-N. The scene cache pre-fetch module 240 stores various inactive, cached scenes 245-A . . . 245-N so that they can be loaded quickly without being fully re-evaluated. To explain further, scenes may require certain CSS, JavaScript, and HTML resources. By loading scenes from the scene cache pre-fetch module 240 and not requiring full re-evaluation, the re-initialization process can be simplified and loading speed can be improved.

The scene cache pre-fetch module 240 is controlled and accessed by the scene controller 225. The scene controller 225 is called by the application 110 at various points in time to retrieve and use the cached scenes 245-A . . . 245-N. For example, when a user interacts with a particular active scene 270 that is active on the persisted UI, the scene controller 225 can load one or more of the cached scenes 245-A . . . 245-N that is not being rendered from the scene cache pre-fetch module 240. This way when the user clicks on a cached scene 245-A . . . 245-N, it's already initialized and ready to be loaded without being fully re-evaluated. This can reduce the normal delay associated with loading a new scene. Thus, in accordance with the disclosed embodiments, once scenes are initially loaded at the scene cache pre-fetch module 240, they can be reloaded or refreshed at a much faster rate by the scene controller 225. When certain cached scenes stored in the scene cache pre-fetch module 240 are old and have not been used for a certain period of time, etc., those cached scenes can be discarded so that the scene cache pre-fetch module 240 does not become bloated with unnecessary cached scenes.

Inter-process communication between the scene controller 225 and the scene cache pre-fetch module 240 can provide certain benefits and advantages. For example, the scene cache pre-fetch module 240 can improve efficiency by allowing for re-use of cached scenes 245-A . . . 245-N. As such, the disclosed embodiments can help reduce the need to reload. By contrast, when scene reuse is not possible, a fresh scene instance can be loaded at the scene controller 225. In addition, this "scene-isolated" rich Internet application 110 is constructed in a way that provides isolation ("or sand-boxing") between cached scenes 245-A . . . 245-N stored at the scene cache pre-fetch module 240 and the active scene 270 that is currently active, while also allowing for reuse of shared libraries and core logic 252 of the rich Internet application 110. In this regard, the scene controller 225 acts as an isolation boundary between an active scene 270 and cached scenes 245-A . . . 245-N. The persisted controller 220 and the shared libraries and core logic 252 can remain resident, for example, at the web browser 122 of the client 120. By caching scenes at the scene cache prefetch module 240, the scene controller 225 can directly use the cached scenes 245. In at least one embodiment, the process space of the scenes can be isolated using an IFrame. Certain scenes are sandboxed to allow for expedited initialization/destruction so that global state (e.g., core logic) is not disrupted. In addition, limitations can be put in place in terms of the ability to call between the scenes (e.g., effectively nothing is allowed). When scenes of the application 110 are isolated from each other, access to persisted space can be limited to concrete/limited API. Scenes are unable, for instance, to modify variables in the persisted space directly, cannot communicate with each other directly, are not able to entirely dispose of the application 110, and are not able to alter core logic (e.g., scenes can only spawn through the scene controller 225 and cannot directly spawn another scene; a scene cannot be loaded while another was already loaded, or bypass proper processing).

Figure 3:
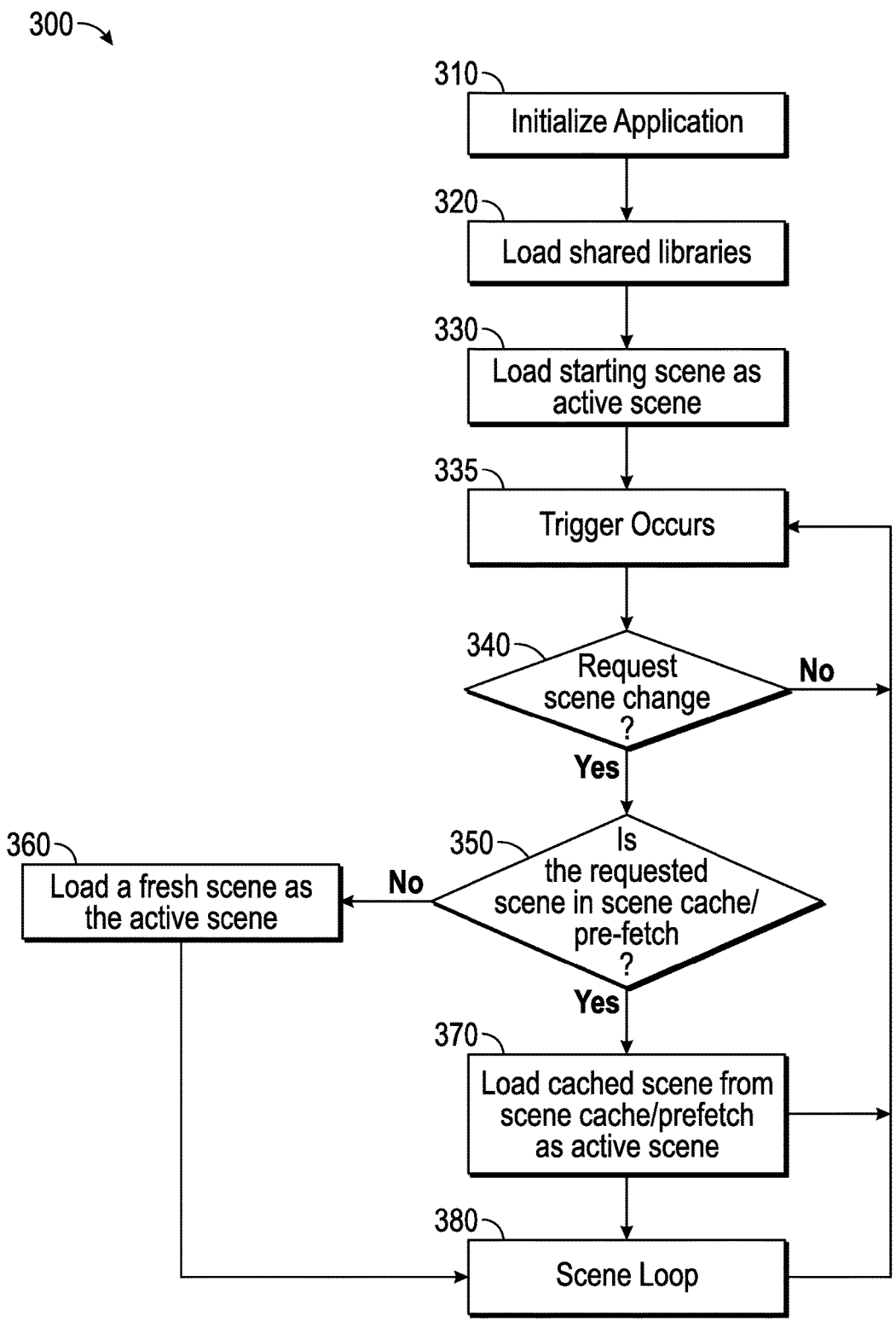
FIG. 3 is a flowchart that illustrates a method in accordance with the disclosed embodiments.

FIG. 3 is a flowchart that illustrates a method 300 in accordance with the disclosed embodiments. The method 300 describes interaction between the persisted controller 220 and the scene cache pre-fetch module 240 as a user of the application 210 interacts with the application 210 to select and render different scenes. As such, the method 300 of FIG. 3 will be described below with reference to FIGS. 1 and 2. As a preliminary matter, it should be understood that steps/tasks/acts of the method 300 are not necessarily presented in any particular order and that performance of some or all the steps/tasks/acts in an alternative order is possible and is contemplated. The steps/tasks/acts have been presented in the demonstrated order for ease of description and illustration. Further, steps/tasks/acts can be added, omitted, and/or performed simultaneously without departing from the scope of the appended claims. It should also be understood that the illustrated method 300 can end at any time. In certain embodiments, some or all steps/tasks/acts of this process, and/or substantially equivalent steps/tasks/acts, are performed by execution of processor-readable instructions stored or included on a processor-readable medium, for example. For instance, references to a processor performing functions of the present disclosure refer to any one or more interworking computing components executing instructions, such as in the form of an algorithm, provided on at least one non-transitory processor-readable medium, such as a memory 106 associated with the server 100 of FIG. 1, etc.

At step/task/act 310, the application framework 210 is loaded and is initialized. The application developer can specify a starting scene that is to be loaded as the "initial" active scene 270 when the application 110 is initialized.

At step/task/act 320, the shared libraries and core logic 252 are loaded at the shared library and core logic controller 227.

At step/task/act 330, the scene controller 225 loads the starting active scene 270 at the UI 255 and the active scene 270 begins to render.

Once the active scene 270 begins to render, one or more triggers can occur (e.g., the user can interact with the active scene 270) at step/task/act 335, and various other operations can performed. The scene controller 225 can receive requests, which are generated in response to a trigger, to change an active scene 270 that is currently active as the user interface 255 of the application. For example, the trigger can be generated as a result of user interaction with the user interface of the application 110, such as selection of a new scene of the application 110, or can be generated as a result of a programmatic trigger, for example, a login timeout could be triggered, requesting the login screen be loaded. The scene controller 225 may request additional resources, may request access to particular libraries in the set of shared libraries 252, may load additional libraries into the set of shared libraries 252, etc. In some cases a new scene may eventually be requested (e.g., based on a user input), at least some of which can be stored as cached scenes 245-A . . . 245-N at the scene cache pre-fetch module 240.

At step/task/act 340, the scene controller 225 continuously checks to determine whether a scene change has been requested (e.g., a new scene that is different than the current active scene has been requested). When a scene change is not requested at step/task/act 340, the user continues to interact with the active scene 270 at step/task/act 335.

When a scene change is requested at step/task/act 340, the method 300 proceeds to step/task/act 350, where the scene controller 225 determines whether the new scene being requested is stored as one of the cached scenes 245-A . . . 245-N at the scene cache pre-fetch module 240.

If the new scene being requested is stored as one of the cached scenes 245-A . . . 245-N at the scene cache pre-fetch module 240, the method 300 proceeds to step/task/act 370 where the scene controller 225 loads the cached scene 245 as the new active scene 270 at the UI 255, and then to step/task/act 380 where the scene loops while the user interacts until a trigger event occurs (e.g., a new scene is requested via the scene controller 225 or the application 110 is closed, etc.). In addition, the previous scene that was active can be either discarded or stored as one of the cached scenes 245-A . . . 245-N at the scene cache pre-fetch module 240.

When it is determined (at step/task/act 350) that the particular new scene being requested is not within the scene cache pre-fetch module 240, the method 300 proceeds to step/task/act 360 where an instance of a fresh scene is prepared as the new active scene to be loaded. The method 300 then proceeds back to step/task/act 380, where the active scene 270 is loaded and continues to loop while the user interacts with it until a trigger event occurs (e.g., a new scene is requested or the application is closed).

Thus, in accordance with the disclosed embodiments, computer-implemented methods, systems, apparatus and associated computer-readable media are provided that can provide an application framework that is developed and integrated with a scene-isolated web application for use in a computer-implemented system. In a scene-isolated web application of the disclosed embodiments, long-living code and resource storage can be isolated from short-lived and potentially conflicting resources (e.g., CSS) in sandboxed scenes. The sandboxed scenes are decoupled from the system to allow one or more development approaches to be performed. The application framework can be used to control a user interface of the scene-isolated web application. Sub-scenes can be rendered in a sandboxed context thereby allowing them to be cleanly unloaded, while still allowing efficient access to the shared libraries and core logic needed by the system as a whole. Scenes can be pre-prepared or recycled for later usage, which effectively allows a finer-grained data caching and script caching mechanism. As such, the disclosed embodiments can allow for construction of large-scale rich Internet applications that do not suffer from the usual challenges and that can control components like module-level caching and garbage collection.

The disclosed embodiments can be implemented in the context of any computer-implemented system, such as a software-based system, a database system, a multi-tenant environment, or the like. Moreover, the described subject matter can be implemented in connection with two or more separate and distinct computer-implemented systems that cooperate and communicate with one another. One or more implementations may be implemented in numerous ways, including as a process, an apparatus, a system, a device, a method, a computer readable medium such as a non-transitory computer readable storage medium storing computer readable instructions or computer program code executable by a processor to perform a method as described above, or as a computer program product comprising a computer usable medium having a computer readable program code embodied therein. Yet another implementation may include a system including memory and one or more processors operable to execute instructions, stored in the memory, to perform any of the steps of the method described above.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be loaded via computer networks such as the Internet, an intranet, a LAN, or the like.

The various tasks performed in connection with method 300 may be performed by software, hardware, firmware, or any combination thereof. For illustrative purposes, the following description of method 300 may refer to elements mentioned above in connection with FIGS. 1 and 2. In practice, portions of method 300 may be performed by different elements of the described system, e.g., component A, component B, or component C. It should be appreciated that method 300 may include any number of additional or alternative tasks, the tasks shown in FIG. 3 need not be performed in the illustrated order, and method 300 may be incorporated into a more comprehensive procedure or process having additional functionality not described in detail herein. Moreover, one or more of the tasks shown in FIG. 3 could be omitted from an embodiment of the method 300 as long as the intended overall functionality remains intact.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A computer-implemented system, comprising:
    a memory configured to store computer-executable instructions of:
        a rich Internet application comprising:
            a plurality of scenes capable of being presented as a user interface of the rich Internet application, wherein the rich Internet application is configured to load and render different scenes in response to interaction with the rich Internet application, wherein each scene is a portion of the rich Internet application that is active when loaded to render an active portion of content of the rich Internet application at a browser until a new scene is selected, and wherein each scene comprises: an IFrame having unique application data associated therewith that defines content and characteristics that are unique to that scene, and associated application logic unique to that scene and for rendering each scene; and
            a set of shared libraries and core logic specific to the rich Internet application that are used to render common portions that are the same in each scene of the rich Internet application;
        an application framework integrated with the rich Internet application, the application framework comprising:
            a persisted controller comprising:
                a scene controller that is designed to receive requests to change an active scene that is currently active as the user interface of the rich Internet application; and a shared library and core logic controller configured to access and load the set of shared libraries and core logic to render common portions that are the same in each scene of the rich Internet application; and a scene cache pre-fetch module communicatively coupled to and controlled by the scene controller, wherein the scene controller communicates with the scene cache pre-fetch module using inter-process communications, the scene cache pre-fetch module being designed to store particular ones of the plurality of scenes that are inactive as cached scenes, and wherein the scene controller is configured to: serve as an isolation boundary that isolates the cached scenes stored at the scene cache pre-fetch module from the active scene that is currently being presented via the user interface; and when a cached scene is selected, load the cached scene directly from the scene cache pre-fetch module as a new active scene to thereby reduce delay normally associated with loading; and a processor communicatively coupled to the memory and capable of executing the computer-executable instructions.

2. A computer-implemented system according to claim 1, wherein the scene cache pre-fetch module is further designed to store application data associated with each of cached scenes.

3. A computer-implemented system according to claim 1, wherein the set of shared libraries and core logic are configured as part of the rich Internet application and are temporarily stored by the shared library and core logic controller.

4. A computer-implemented system according to claim 1, wherein the user interface comprises:

a persisted user interface that is capable of:
storing persistent content that is common to each scene of the rich Internet application;
presenting the persistent content as the user interface in conjunction with each scene of the rich Internet application;
temporarily storing application data associated with the active scene; and
presenting the active scene that is currently active via the user interface.

5. A computer-implemented method for rendering different scenes as a user interface of a rich Internet application comprising a plurality of scenes and set of shared libraries and core logic, wherein the rich Internet application is configured to load and render different scenes in response to interaction with the rich Internet application, wherein each scene is a portion of the rich Internet application that is active when loaded to render an active portion of content of the rich Internet application at a browser until a new scene is selected, and, wherein each scene comprises: an IFrame having unique application data associated therewith that defines content and characteristics that are unique to that scene, and associated application logic unique to that scene and for rendering each scene, wherein the set of shared libraries and core logic are specific to the rich Internet application and used to render common portions that are the same in each scene of the rich Internet application, the computer-implemented method comprising:

loading an application framework integrated with the rich Internet application and initializing the application framework by loading a starting scene as a current active scene as the user interface, wherein the application framework comprises: a persisted controller comprising: a scene controller that is designed to receive requests to change an active scene that is currently active as the user interface of the rich Internet application; and a shared library and core logic controller configured to access and load the set of shared libraries and core logic to render common portions that are the same in each scene of the rich Internet application; and a scene cache pre-fetch module communicatively coupled to and controlled by the scene controller, wherein the scene cache pre-fetch module being designed to store particular ones of the plurality of scenes that are inactive as cached scenes, and wherein the scene controller is configured to: serve as an isolation boundary that isolates the cached scenes stored at the scene cache pre-fetch module from the active scene that is currently being presented via the user interface;

receiving, at the scene controller a request for a new scene that is different than the current active scene being rendered as the user interface;

determining, at the scene controller whether the new scene being requested is stored as a cached scene at the scene cache pre-fetch module that stores at least some of the plurality of scenes as cached scenes that are isolated from the current active scene that is currently being rendered as the user interface, wherein the scene controller communicates with the scene cache pre-fetch module using inter-process communications; and when the new scene being requested is determined to be stored as a cached scene at the scene cache pre-fetch module: loading, at the scene controller directly from the scene cache pre-fetch module using inter-process communications, the cached scene as a new active scene at the user interface to thereby reduce delay normally associated with loading.

6. A computer-implemented method according to claim 5, wherein the cached scenes are capable of being loaded by the scene controller.

7. A computer-implemented method according to claim 5, further comprising:

after determining that the new scene being requested is stored as a cached scene at the scene cache pre-fetch module storing the starting scene as one of the cached scenes at the scene cache pre-fetch module.

8. A computer-implemented method according to claim 5, further comprising:

when the new scene being requested is determined to not be stored as one of the cached scenes at the scene cache pre-fetch module: loading, at the scene controller from a server, a fresh instance of the new scene being requested as the new active scene as the user interface.

9. A computer-implemented method according to claim 5, wherein the scene cache pre-fetch module is further designed to store application data associated with each of cached scenes.

10. A computer-implemented method according to claim 5, wherein the set of shared libraries and core logic are configured as part of the rich Internet application and are temporarily stored by the shared library and core logic controller.

11. A computer-implemented method according to claim 5, further comprising:

storing, at a persisted user interface of the user interface, persistent content that is common to each scene of the rich Internet application;

presenting, via the persisted user interface, the persistent content as the user interface in conjunction with each scene of the application;

temporarily storing, at the persisted user interface of the user interface, application data associated with the active scene; and presenting the active scene that is currently active via the user interface.

12. A non-transitory computer readable storage media comprising: computer instructions to implement the computer-implemented method of claim 5.

13. A computing device comprising a processor and a memory, wherein the memory comprises computer-executable instructions that, when executed by the processor, cause the computing device to execute a rich Internet application to render different scenes of a plurality of scenes as a user interface of the rich Internet application, wherein the rich Internet application comprises the plurality of scenes and set of shared libraries and core logic, wherein the rich Internet application is configured to load and render different scenes in response to interaction with the rich Internet application, wherein each scene is a portion of the rich Internet application that is active when loaded to render an active portion of content of the rich Internet application at a browser until a new scene is selected, wherein each scene comprises: an IFrame having unique application data associated therewith that defines content and characteristics that are unique to that scene and associated application logic unique to that scene and for rendering each scene, wherein the set of shared libraries and core logic are specific to the rich Internet application and used to render common portions that are the same in each scene of the rich Internet application, wherein execution of the computer-executable instructions by the processing system causes the computing device to:

load an application framework integrated with the rich Internet application, the application framework comprising a persisted controller comprising: a scene controller that is designed to receive requests to change an active scene that is currently active as the user interface of the rich Internet application; and a shared library and core logic controller configured to access and load the set of shared libraries and core logic to render common portions that are the same in each scene of the rich Internet application; and a scene cache pre-fetch module communicatively coupled to and controlled by the scene controller, wherein the scene cache pre-fetch module being designed to store particular ones of the plurality of scenes that are inactive as cached scenes, and wherein the scene controller is configured to: serve as an isolation boundary that isolates the cached scenes stored at the scene cache pre-fetch module from the active scene that is currently being presented via the user interface, initialize the application framework by loading a starting scene as a current active scene as the user interface;

receive, at the scene controller, a request for a new scene that is different than the current active scene being rendered as the user interface, wherein the current active scene that is currently being rendered as the user interface is isolated from the cached scenes;

determine, at the scene controller, whether the new scene being requested is stored as a cached scene at the scene cache pre-fetch module that stores at least some of the plurality of scenes as cached scenes that are isolated from the current active scene that is currently being rendered as the user interface, wherein the scene controller communicates with the scene cache pre-fetch module using inter-process communications; and when the new scene being requested is determined to be stored as a cached scene at the scene cache pre-fetch module: load, at the scene controller directly from the scene cache pre-fetch module using inter-process communications, the cached scene as a new active scene at the user interface to thereby reduce delay normally associated with loading.

14. A computer program product for use with a computer including a display for presenting a user interface of a rich Internet application, the computer program product comprising a non-transitory computer readable medium having a computer readable program code embodied therein for controlling the user interface of the application, the computer program product comprising:

wherein the rich Internet application comprises:

a plurality of scenes capable of being presented as the user interface of the rich Internet application, wherein the rich Internet application is configured to load and render different scenes in response to interaction with the rich Internet application, wherein each scene is a portion of the rich Internet application that is active when loaded to render an active portion of content of the rich Internet application at a browser until a new scene is selected, and wherein each scene comprises: an IFrame having unique application data associated therewith that defines content and characteristics that are unique to that scene, and associated application logic unique to that scene and for rendering each scene;

a set of shared libraries and core logic specific to the rich Internet application that are used to render common portions that are the same in each scene of the rich Internet application; and an application framework integrated with the rich Internet application, the application framework comprising:

a persisted controller comprising:

a scene controller that is designed to receive requests to change an active scene that is currently active as the user interface of the rich Internet application; and a shared library and core logic controller configured to access and load the set of shared libraries and core logic to render common portions that are the same in each scene of the rich Internet application; and a scene cache pre-fetch module communicatively coupled to and controlled by the scene controller, wherein the scene controller communicates with the scene cache pre-fetch module using inter-process communications, the scene cache pre-fetch module being designed to store particular ones of the plurality of scenes that are inactive as cached scenes, and wherein the scene controller is configured to: serve as an isolation boundary that isolates the cached scenes stored at the scene cache pre-fetch module from the active scene that is currently being presented via the user interface; and when a cached scene is selected, load the cached scene directly from the scene cache pre-fetch module as a new active scene to thereby reduce delay normally associated with loading.

\* \* \* \* \*